US012327465B1

(12) United States Patent
Firtel

(10) Patent No.: US 12,327,465 B1
(45) Date of Patent: Jun. 10, 2025

(54) APPARATUS AND METHOD FOR REMINDING THROUGH ALERTS

(71) Applicant: Burton Firtel, Highland Beach, FL (US)

(72) Inventor: Burton Firtel, Highland Beach, FL (US)

( * ) Notice: Subject to any disclaimer, the term of this patent is extended or adjusted under 35 U.S.C. 154(b) by 29 days.

(21) Appl. No.: 18/106,164

(22) Filed: Feb. 6, 2023

Related U.S. Application Data

(60) Provisional application No. 63/350,472, filed on Jun. 9, 2022, provisional application No. 63/306,923, filed on Feb. 4, 2022.

(51) Int. Cl.
*G08B 21/24* (2006.01)

(52) U.S. Cl.
CPC .................................... *G08B 21/24* (2013.01)

(58) Field of Classification Search
CPC ...................................................... G08B 21/24
See application file for complete search history.

(56) References Cited

U.S. PATENT DOCUMENTS

| | | | |
|---|---|---|---|
| 9,286,783 B1 | 3/2016 | Teller et al. | |
| 9,327,645 B2 | 5/2016 | Raman et al. | |
| 9,552,717 B1 | 1/2017 | Rudolph | |
| 9,715,816 B1 * | 7/2017 | Adler | G06F 3/0481 |
| 2011/0155554 A1 * | 6/2011 | Kataoka | H01H 13/78 200/516 |
| 2012/0265535 A1 | 10/2012 | Bryant-Rich et al. | |
| 2013/0257604 A1 | 10/2013 | Mirle et al. | |
| 2018/0276974 A1 | 9/2018 | Talty et al. | |
| 2019/0250793 A1 * | 8/2019 | Choi | H04M 1/724 |
| 2022/0375323 A1 * | 11/2022 | Nelson | H04M 1/72412 |

FOREIGN PATENT DOCUMENTS

| | | |
|---|---|---|
| CA | 2734436 C | 6/2016 |

* cited by examiner

*Primary Examiner* — Benyam Haile
(74) *Attorney, Agent, or Firm* — John Rizvi; John Rizvi, P.A.—The Patent Professor ®

(57) ABSTRACT

An apparatus, a method and a computer program product provides reminders to an individual when entering or exiting a vehicle or other spaces. A smart reminder apparatus comprising a speaker(s), and a number of sensors including motion sensors, a microphone and/or optical sensors in communication with a controller that enables a user to record one or more reminder messages indicating items to be transported from one location to a next location as well as tasks to be performed in association with the user's entry into or departure from a particular location or space. The reminder apparatus is placed in selected areas which transforms the area into a monitored space. The apparatus can be configured to determine whether a recorded message is currently available and prompts a user to record a message if no message is recorded when the apparatus detects that the user has entered or exited a monitored space.

20 Claims, 12 Drawing Sheets

APPARATUS AND METHOD FOR REMINDING THROUGH ALERTS

CROSS-REFERENCE TO RELATED APPLICATIONS

This application claims the benefit of U.S. Provisional Patent Application Ser. No. 63/350,472, filed on Jun. 9, 2022, and U.S. Provisional Patent Application Ser. No. 63/306,923, filed on Feb. 4, 2022, which are incorporated herein in its entirety.

FIELD OF THE INVENTION

The present invention relates generally to reminder systems, and more particularly, to reminder message creation and transmission.

BACKGROUND OF THE INVENTION

Many older adults worry about their memory and other thinking abilities. For example, they might be concerned about taking longer than before to learn new things, or they may sometimes forget to pay a bill. People forget things ranging from simple tasks such as remembering to buy groceries, or to take a parcel to the post office to more complex tasks or ideas. In fact, one in nine Americans aged 45 and older, convinced they are experiencing thinking declines and/or issues associated with remembering, report having memory issues. These issues are usually signs of mild forgetfulness, which are often a normal part of aging, and not necessarily serious memory problems.

Some people are tempted by untried or unproven "cures" that claim to make the brain sharper. The market is full of pills, supplements, brain training computer games, or other products that promise to improve memory. Some of these products might be unsafe, a waste of money, or both. Some of these products may also interfere with a person's current medical treatment.

Ideally, it would be extremely useful to provide a system that helps people to remember to do tasks ranging from simple activities to more complex tasks. Furthermore, the system should be safe and should not interfere with any potential medical treatment a person may be undergoing.

Accordingly, there is need for a non-invasive solution for enhancing a user's ability to remember to perform various types of tasks and activities especially activities that the person can identify as being particularly important.

SUMMARY OF THE INVENTION

The present invention is directed to an apparatus, a method, and a computer program product for providing reminders to an individual when entering or exiting a vehicle or other selected spaces. A smart reminder apparatus (SRA) comprising a speaker(s), and a number of sensors including a motion sensor, a microphone and/or optical sensors in communication with a controller enables a user to record one or more reminder messages indicating items to be transported/transferred from one location to a next location as well as tasks to be performed in association with the user's entry into or departure from a particular location and/or space. The smart reminder apparatus is placed in selected areas/spaces which transforms the area into a monitored space. According to an aspect, the SRA can be configured to determine whether a recorded message is currently available and to prompt a user to record a message if no message is recorded when the apparatus detects that the user has entered or exited a monitored space. If a message is already recorded, the apparatus plays the message each time the user exits the space and/or re-enters the space as long as the recording is not deleted. The user can choose to erase the message once action has been taken to fulfill the tasks indicated by the reminders.

According to one or more aspects, the SRA includes a RECORD button that is used to activate a microphone during a personal recording mode. A PLAYBACK button is used to listen to reminder messages previously stored/recorded in memory during a personal recording mode.

According to an aspect, the microphone is used to record audio in the personal recording mode. A speaker is used to play stored audio recordings when signaled by the controller.

In another aspect of the instant invention, the SRA device may comprise a housing that includes an internal space, a printed circuit board that includes a micro-controller disposed inside of the internal space of the housing, a speaker, a microphone, and a detector (i.e., a motion sensor, voltage sensor, or other sensor) in communication with the printed circuit board, a power supply powering the speaker and the microphone, and one or more controller buttons disposed on the housing configured to close one or more etched pathways on the circuit board.

According to an aspect, the SRA is designed having multiple (e.g., two) motion sensors. A second motion sensor can be used to detect movement which occurs when a user exits a target door, such as a front door. According to a related aspect, the SRA can be configured to use dual motion sensors to detect a direction of movement of the user, such as when the user enters the room via the door and also when the user exits the room through the door. Furthermore, the SRA can be configured to enable different reminder messages to be played depending on the detected direction of movement of the user.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present disclosure is directed toward an apparatus and a method for providing reminder messages to response to detected movements of an individual.

Figure 1:
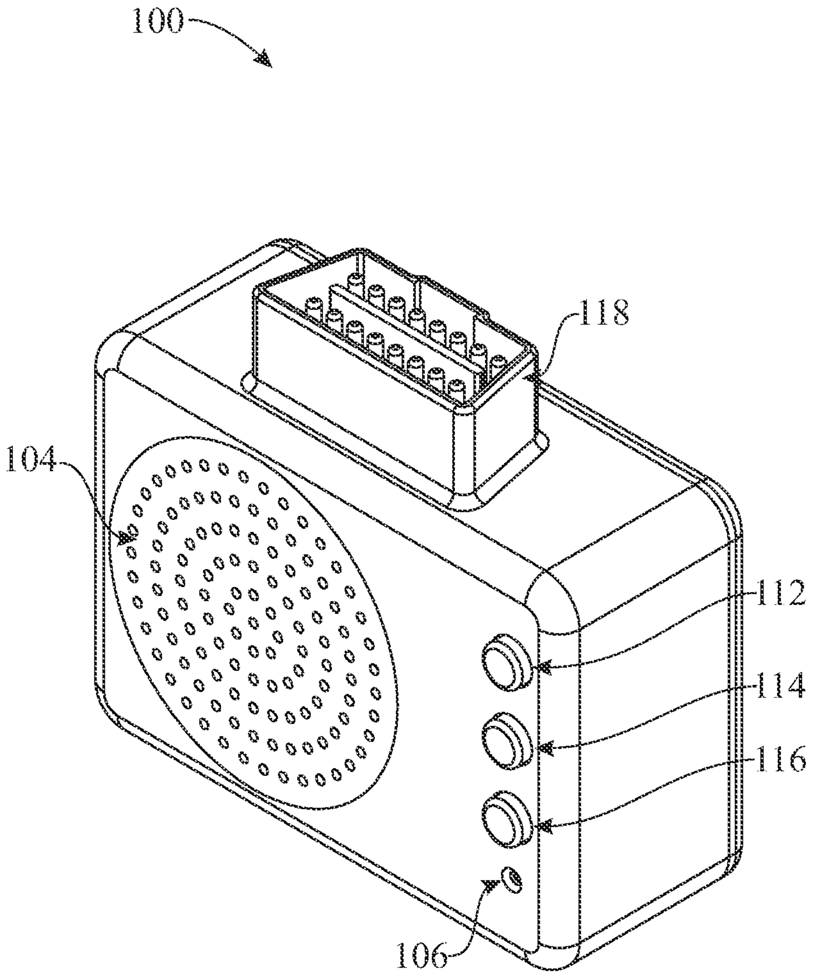
FIG. 1 illustrates an isometric view of an example smart reminder apparatus (SRA), according to one or more embodiments of the disclosure.

With reference now to the figures, and beginning with FIG. 1, there is depicted an isometric view of an example smart reminder apparatus (SRA), according to one or more embodiments. The SRA 100 comprises Input/Output (I/O) components including a speaker 104 and a microphone 106. In addition, SRA 100 comprises control buttons including an ON/OFF Mode Switch 112, a RECORD button 114, and a PLAYBACK button 116. Additionally, the SRA 100 comprises an onboard diagnostic (OBD) port 118. The I/O components 104 and 106, the control buttons 112, 114 and 116, and the OBD port 118 are each connected to a controller 304 (FIG. 3) which controls operation of the SRA 100.

According to an aspect, the ON/OFF Mode switch 112 is used to activate and deactivate the SRA 100. According to an aspect, the ON/OFF Mode switch 112 can also be used to switch between a pre-recorded message reminder mode, which provides the frequently used and repeatable reminder messages and/or message prompts, and a personal recorded message reminder mode which provides short term reminder messages and/or one-time reminder messages. According to an implementation, the SRA 100 is configured to enable a user that presses the ON/OFF Mode switch 112 by applying a first interaction type, such as a long hold press, to access activation and deactivation functionality of the SRA 100. The SRA 100 is further configured to enable a user that presses the ON/OFF Mode switch 112 by applying a second interaction type, such as a short hold press, to be able to switch between the pre-recorded message mode and the personal recorded message mode.

According to an aspect, the RECORD button 114 is used to activate the microphone during the personal recording mode. The PLAYBACK button 116 is used to listen to reminder messages previously stored/recorded in memory during the personal recording mode.

Figure 3:
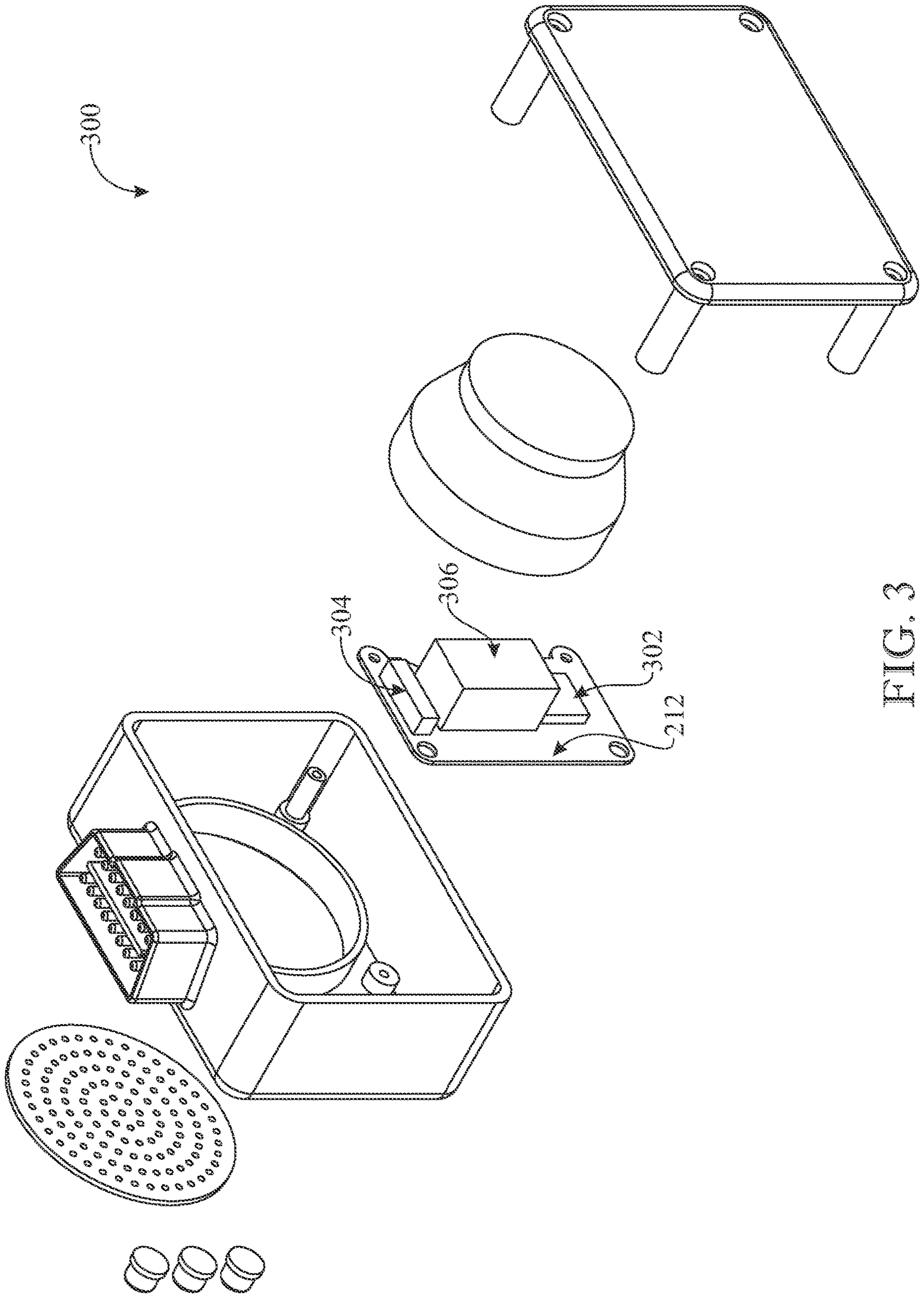
FIG. 3 presents an exploded rear elevated view of the example SRA of FIG. 1, according to one or more embodiments.

According to an aspect, the microphone 106 is used to record audio in the personal recording mode. The speaker 104 is used to play stored audio recordings when signaled by the controller 304 (FIG. 3).

The OBD Port 118 is a standard port used by car manufacturers as a diagnostic port which can detect electrical signals in a vehicle.

Figure 2:
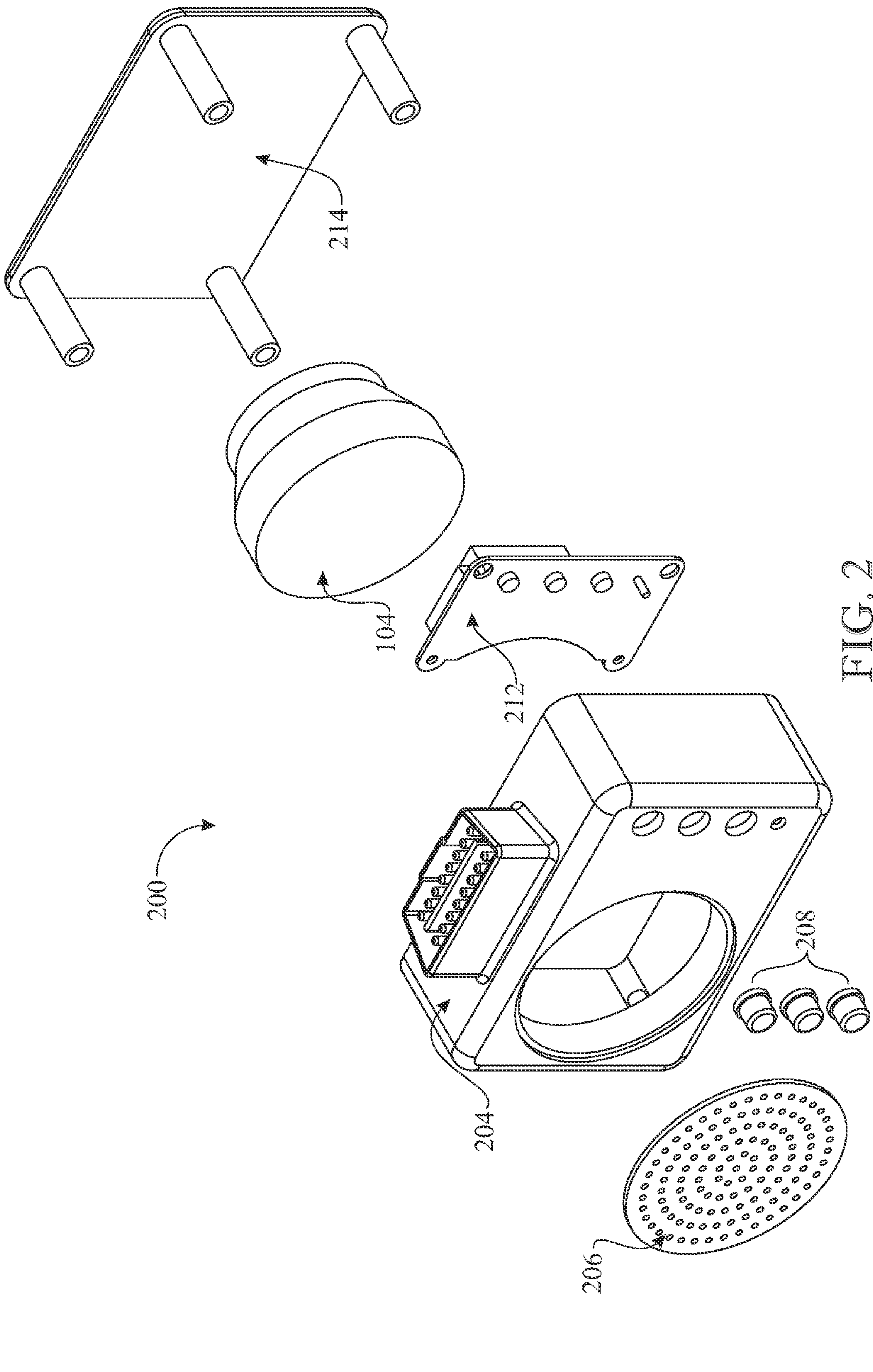
FIG. 2 presents an exploded front elevated view of the example SRA of FIG. 1, according to one or more embodiments of the disclosure.

FIG. 2 presents an exploded front elevated view of the example SRA of FIG. 1, according to one or more embodiments. View 200 shows a front cover 204, a speaker mesh 206, buttons 208, a printed circuit board (PCB) 212, a back cover 214 and a speaker 104. FIG. 3 presents an exploded rear elevated view of the example SRA of FIG. 1, according to one or more embodiments. View 300 shows from a different perspective the components of view 200. As a result of the perspective of view 300, components of the PCB 212, which components are not visible in view 200, are shown in view 300. In particular, view 300 shows memory 302, a micro-controller 304 (i.e., the controller 304) and a battery unit 306.

The OBD Port 118 is used to detect if the engine of the vehicle is off or if the vehicle door is open. The controller 304 receives signals indicating an engine's ON/OFF status and a door OPEN/CLOSE status. In response to receiving the one or more status signals, the controller 304 initiates playback of the pre-recorded audio file or the personal recorded message. The battery unit 306 is continuously charged by the OBD Port 318. However, the battery unit 306 can be charged separately using a USB C Port.

According to one or more aspects, certain/selected functions provided by and/or associated with the smart reminder apparatus/system can be incorporated into an existing car audio interface.

Figure 4:
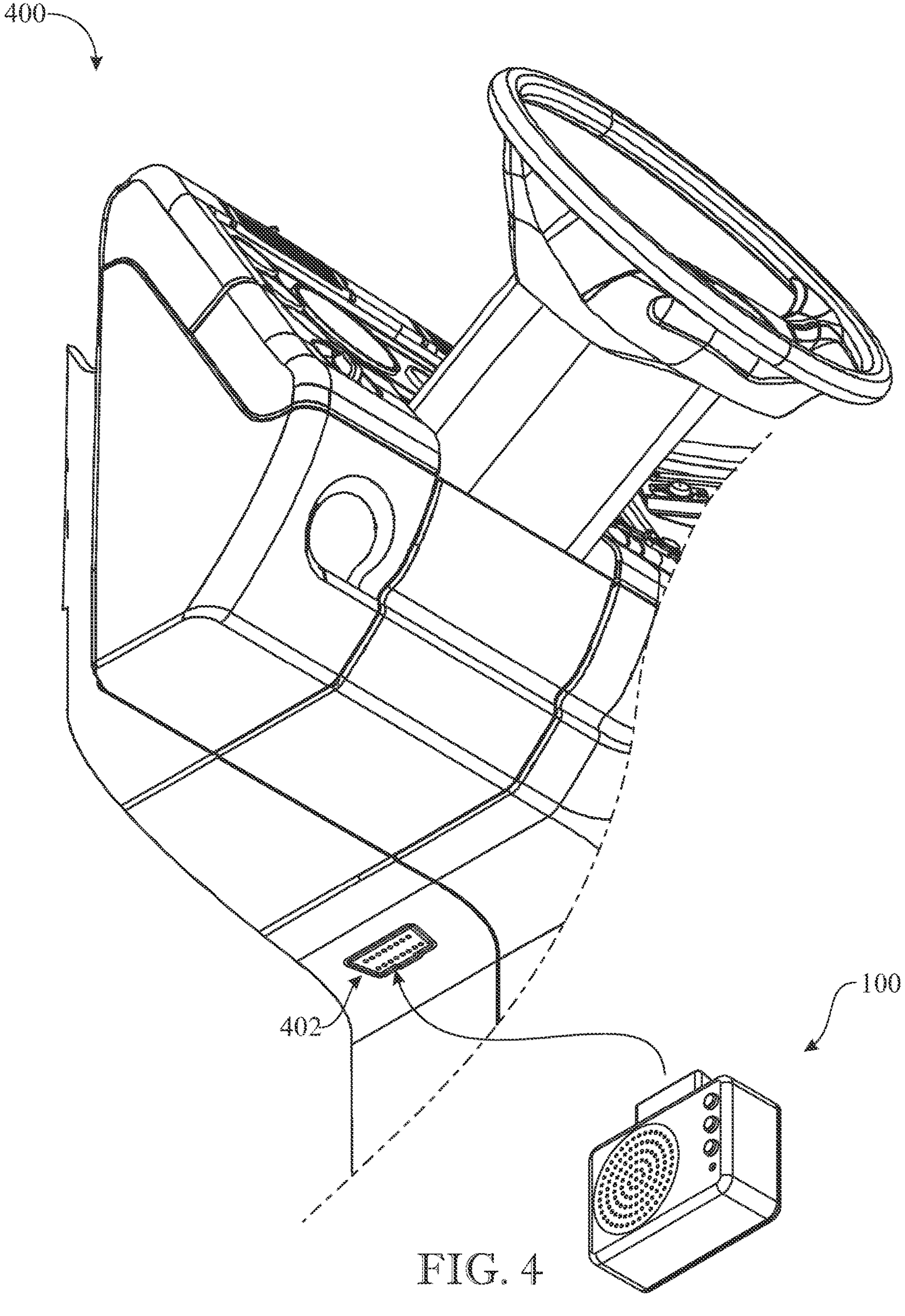
FIG. 4 presents a view of the SRA and an onboard diagnostic (OBD) car port that can be connected to the SRA to enable installation within a vehicle, according to one or more embodiments.
Figure 5:
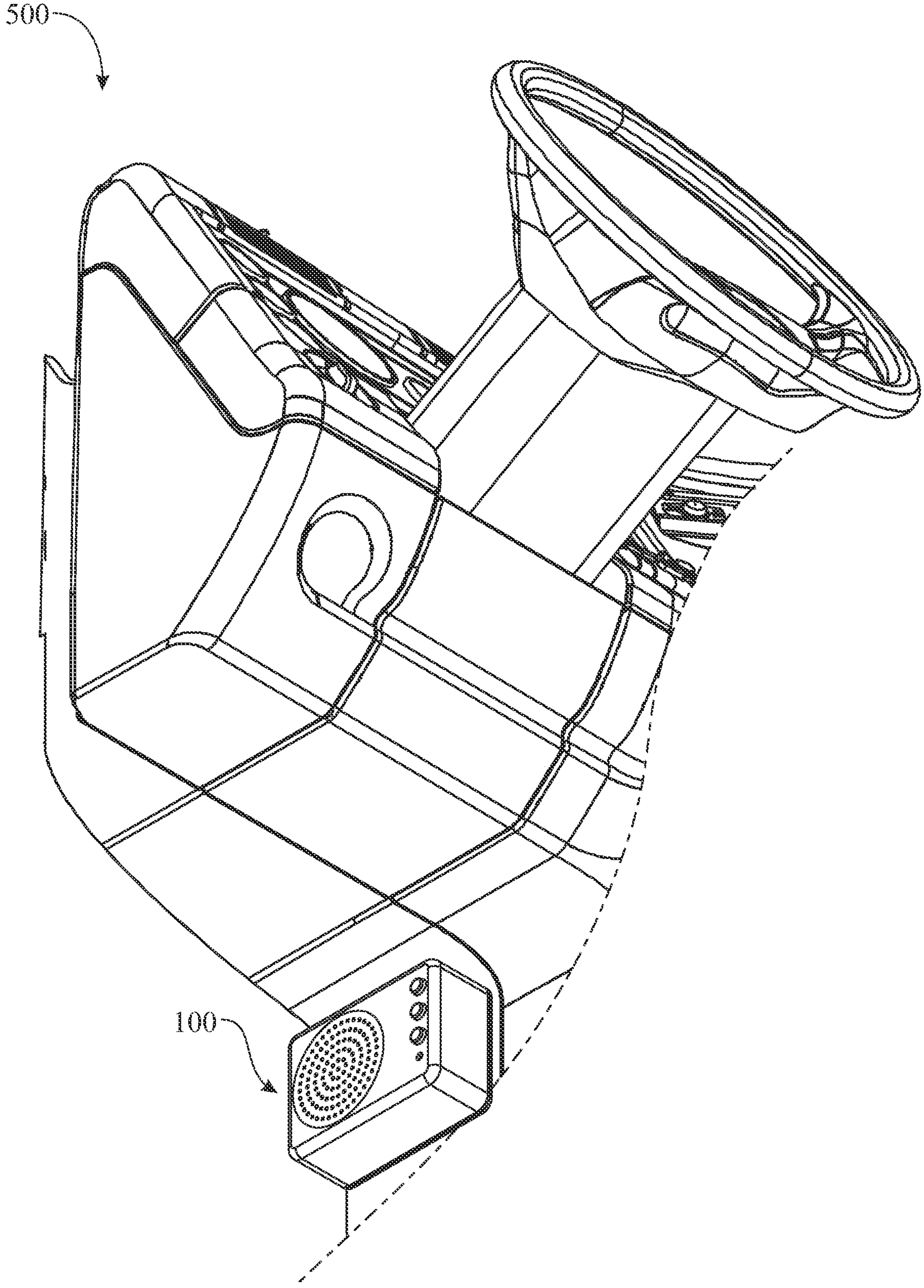
FIG. 5 presents a view of the SRA installed within a vehicle, according to one or more embodiments.

FIG. 4 presents a view of the SRA and an OBD car port that can be connected to the SRA to enable installation within a vehicle, according to one or more embodiments. View 400 shows a vehicle's OBD port 402 which is positioned beneath a dashboard and a steering wheel of the vehicle. As illustrated, the vehicle's OBD port 402 is a complementary/female port with respect to the OBD (male) port 118 of the SRA 100. FIG. 5 presents a view of the SRA installed within a vehicle, according to one or more embodiments. View 500 presents a view of the installed/connected SRA 100. The SRA 100 is installed/connected as a result of the OBD port 118 of the SRA 100 being plugged into the vehicle's OBD port 402.

The SRA 100 provides reminders to an individual entering or exiting a vehicle or other selected spaces. The speaker(s) 104 and the microphone 106 are in communication with the controller 304. The SRA 100 enables a user to pre-record one or more reminder messages indicating items to be transported/transferred from one location to a next location as well as tasks to be performed in association with the user's entry into or departure from the vehicle. When the SRA 100 is installed within a vehicle, the SRA 100 is able to detect the opening and closing of the driver's door via information received via the vehicle's OBD port 402. According to an aspect, the SRA 100 is configured to determine whether a recorded message is currently available and to prompt a user to record a message if no message is recorded when the SRA 100 detects that the user has entered or exited the vehicle. If a message is already recorded, the SRA 100 plays the message each time the user exits the vehicle and/or re-enters the vehicle as long as the recording is not deleted. The user can choose to erase the message once action has been taken to fulfill the tasks indicated by the pre-recorded message reminders.

According to an aspect, a user may record messages to remind the user about a various types of tasks. For example, the user may record a first message to remind the user/driver to not forget keys in the car. As another example, the user may record a second message to remind the user/driver to remember that the baby/child is in the back seat of the vehicle and to not leave the vehicle without the baby. According to an aspect, the SRA is configured to emit a pre-recorded reminder message to the driver through the car's speaker system.

Certain of the functions supported and/or provided by the controller 304 are implemented as processing logic (or code) executed by a processor subsystem and/or other device hardware/components having processing capabilities within or associated with the controller 304, which processing logic enables the controller 304 to implement/perform those function(s). Among the software/firmware code/instructions/logic provided by a smart reminder message (SRM) utility/module, and which are specific to the disclosure, are: (a) logic for pre-recording via an electronic device one or more messages to be used to remind a target individual to perform one or more selected tasks based on the individual's movement activities, wherein the electronic device includes and/or communicates with one or more sensors to detect the target individual's movements; (b) logic for detecting via one or more sensors when an individual enters and/or exits a selected space; (c) logic for initiating a playback of audible messages in response to detecting the individual entering or exiting the space; (d) logic for prompting the individual to record a message when there are no recorded messages available; and (e) logic for enabling the individual to erase a recorded reminder message when action has been taken to fulfill tasks indicated by the reminder message. According to the illustrative embodiment, when controller 304 executes the SRM logic/module, the SRA 100 initiates a series of functional processes that enable the above functional features as well as additional features/functionality. These features/functionalities are described in greater detail within the description of FIGS. 1-7.

Those of ordinary skill in the art will appreciate that the hardware components and basic configuration depicted in FIGS. 1-7 may vary. The illustrative components within SRA 100 are not intended to be exhaustive, but rather are representative to highlight essential components that are utilized to implement the present disclosure. For example, other devices/components may be used in addition to or in place of the hardware depicted. The depicted example is not meant to imply architectural or other limitations with respect to the presently described embodiments and/or the general disclosure.

Figure 6:
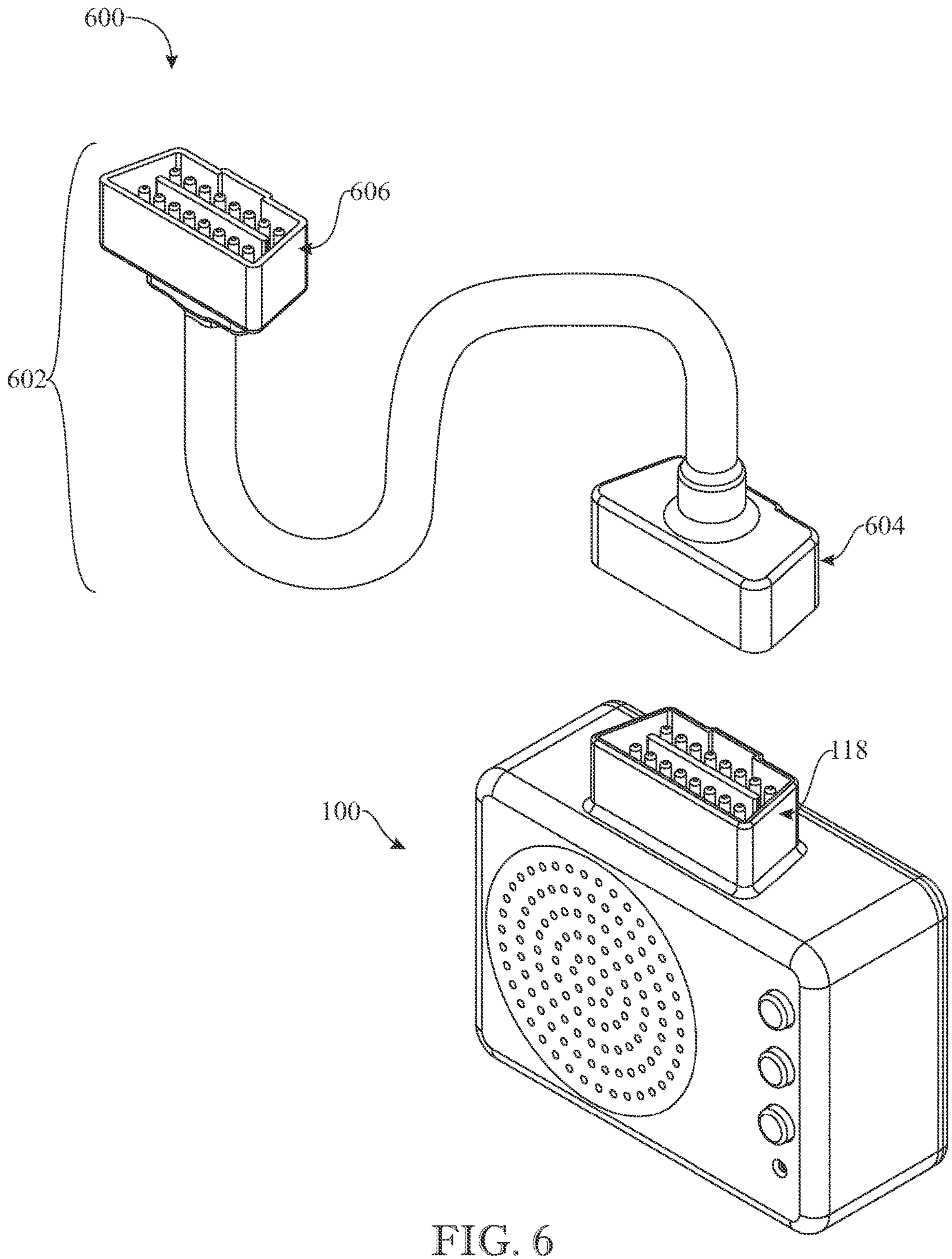
FIG. 6 presents a view of the SRA and an OBD port extension cable that can be connected to the SRA to enable alternate positioning when installed within the vehicle, according to one or more embodiments.

FIG. 6 presents a view of the SRA and an OBD port extension cable that can be connected to the SRA to enable alternate positioning when installed within the vehicle, according to one or more embodiments. View 600 comprises the SRA 100 and an (optional) OBD port extension cable 602 having a female end 604 and a male end 606. The female end 604 is connectable to the OBD port 118 of the SRA 100, and the male end 606 is connectable to the vehicle's OBD port 402. The OBD port extension cable 602 allows users to place the SRA 100 in alternate locations instead of being restricted to a single location directly beneath the vehicle's OBD car port 402, which single location facilitates the direct connection between the vehicle's OBD car port 402 and the OBD port 118 of the SRA 100. According to an implementation, the OBD port extension cable 602 can provide between 12 and 24 inches of additional, flexible extension cable.

Figure 7:
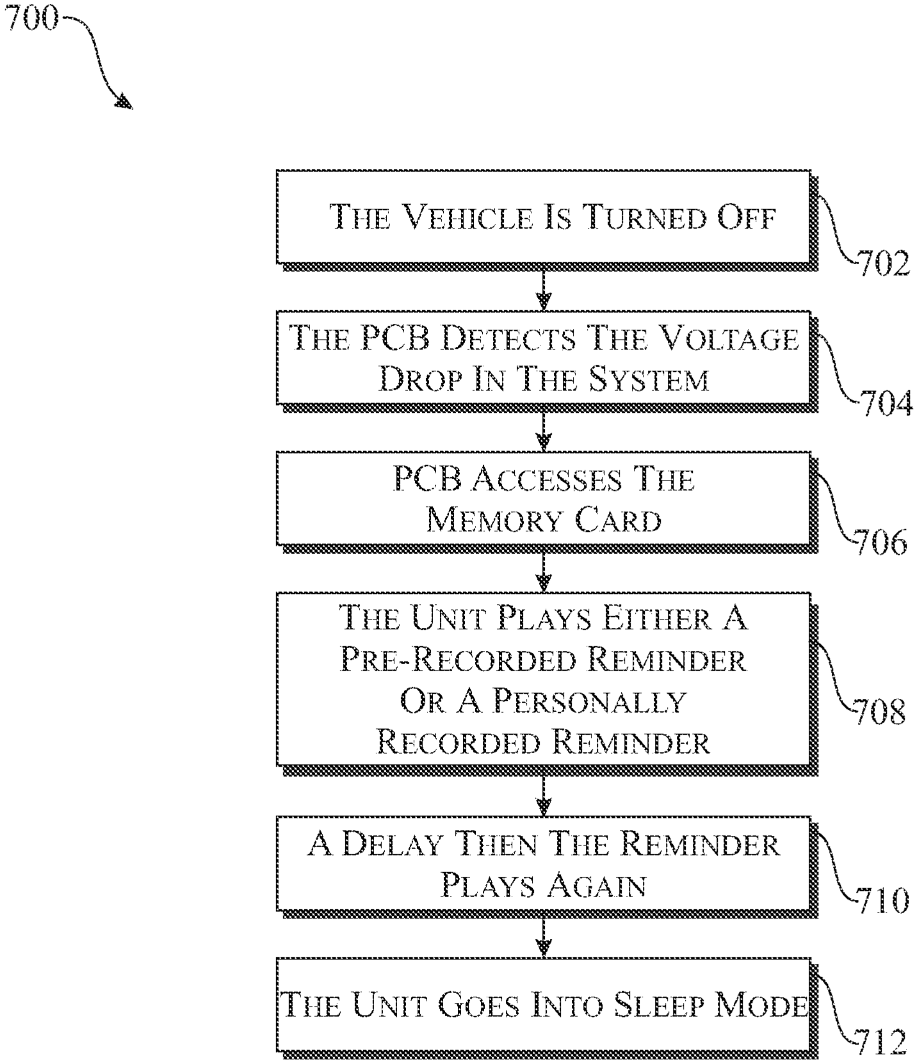
FIG. 7 presents a flow chart illustrating the process of providing reminder messages in response to an individual's entering/exiting a vehicle or a vehicle start-up, according to one or more embodiments.

FIG. 7 is a flow chart illustrating a method by which the above process of the illustrative embodiments is completed. Although the method illustrated in FIG. 7 may be described with reference to components shown in FIGS. 1-6, it should be understood that this is merely for convenience and alternative components and/or configurations thereof can be employed when implementing the various methods. Key portions of the methods may be completed by the controller 304 and/or a smart reminder message (SRM) module executing on a processor subsystem within a controller 304 (FIG. 3) of SRA 100 and controlling specific operations of/on SRA 100, and the methods are thus described from the perspective of either/both the SRM module and the controller 304 or other device that provides the functionality associated with one or more versions of the SRM module.

FIG. 7 presents a flow chart illustrating the process of providing reminder messages in response to an individual's entering/exiting a vehicle or a vehicle start-up, according to one or more embodiments. The process of FIG. 7 begins at block 702 at which the vehicle is initially turned off and proceeds to block 704, at which the controller 304, which is located on PCB 212, detects a voltage drop that is associated with the opening of a vehicle door or a vehicle start-up. At block 706, the controller 304 access the memory card. At block 708, the controller 304 plays either a pre-recorded reminder or a personally recorded reminder. At block 710, the controller 304 replays the reminder message after a preset delay. At block 712, the controller 304 places the SRA 100 into a sleep mode. The process proceeds to an end.

Figure 8:
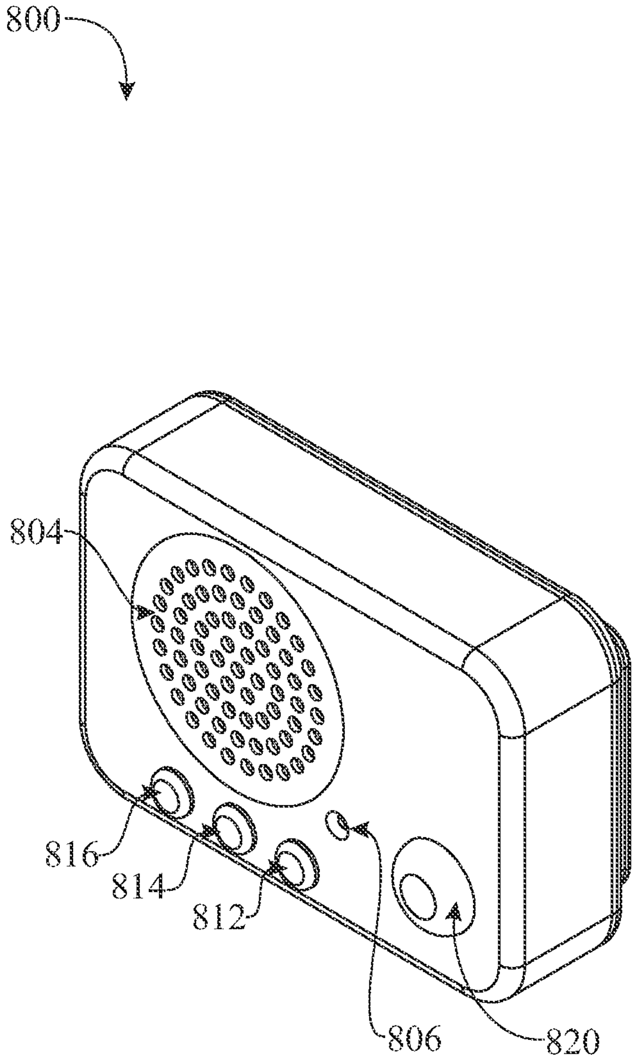
FIG. 8 presents an isometric view of a smart reminder apparatus (SRA), which includes activity/motion detection capabilities, according to one or more embodiments.
Figure 10:
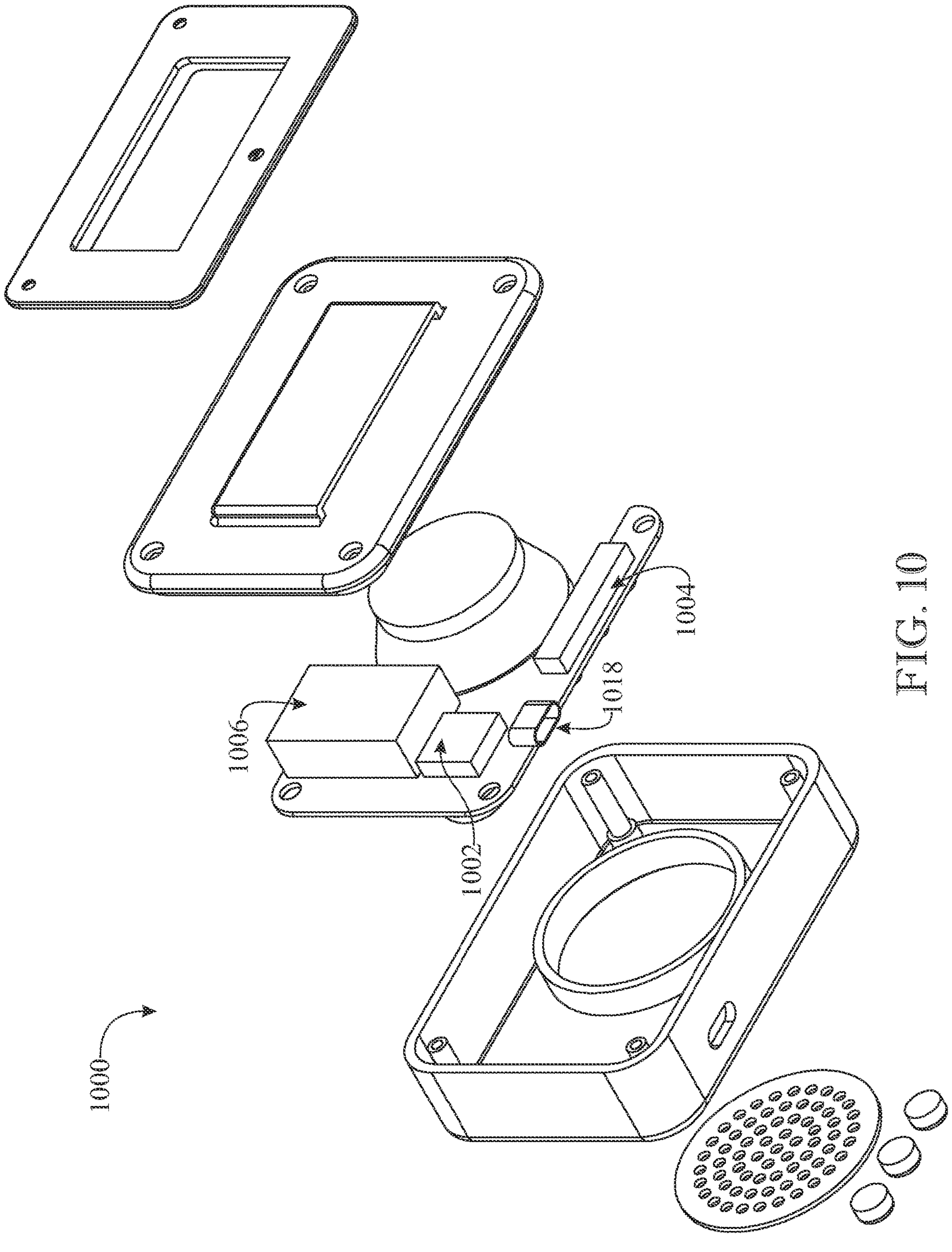
FIG. 10 presents an exploded rear elevated view of the SRA of FIG. 8, according to one or more embodiments.

FIG. 8 presents an isometric view of a smart reminder apparatus (SRA), which includes activity/motion detection capabilities, according to one or more embodiments. The SRA 800 comprises Input/Output (I/O) components including a speaker 804 and a microphone 806. In addition, SRA 800 comprises control buttons including an ON/OFF Mode Switch 812, a RECORD button 814, and a PLAYBACK button 816. Additionally, the SRA 800 comprises a Universal Serial Bus (USB) C port 1018 (FIG. 10). In addition, the SRA 800 comprises one or more motion sensors 820. The I/O components 804 and 806, the control buttons 812, 814 and 816, and the OBD port 1018 are each connected to a controller 1004 (FIG. 10) which controls operation of the SRA 800.

According to an aspect, the ON/OFF Mode switch 812 is used to activate and deactivate the SRA 800. According to an aspect, the ON/OFF Mode switch 812 can also be used to switch between a pre-recorded message reminder mode, which provides the frequently used and repeatable reminder messages and/or message prompts, and a personal recorded message reminder mode which provides short term reminder messages and/or one-time reminder messages. According to an implementation, the SRA 800 is configured to enable a user that presses the ON/OFF Mode switch 812 button by applying a first interaction type, such as a long hold press, to access activation and deactivation functionality of the SRA 800. The SRA 800 is further configured to enable a user that presses the ON/OFF Mode switch 812 button by applying a second interaction type, such as a short hold press, to be able to switch between the pre-recorded mode and the personal recorded mode.

According to an aspect, the RECORD button 814 is used to activate the microphone during the personal recording mode. The PLAYBACK button 816 is used to listen to reminder messages previously stored/recorded in memory during the personal recording mode.

According to an aspect, the microphone 806 is used to record audio in the personal recording mode. The speaker 804 used to play stored audio recordings when signaled by the controller 1004 (FIG. 10).

According to an aspect, the motion sensor(s) 820 is used to detect movement when user exits a target door. According to an implementation, the SRA 800 is configured to provide a pre-determined reset delay between alerts. For example, the predetermined reset delay can be a sixty (60) second reset delay between alerts/reminders.

The motion sensor 820 allows the SRA 800 to detect the movement of the user. Once the motion sensor 820 detects movement, the sensor 820 sends a signal to the controller 1004 to trigger playback of the reminder message(s). According to an aspect, the SRA 800 can be charged using the USB C Port, which enables stand-alone charging.

According to an aspect, the SRA 800 is designed having multiple (e.g., two) motion sensors. A second motion sensor can be used to detect movement which occurs when a user exits a target door, such as a front door. According to a related aspect, the SRA 800 is configured to use dual motion sensors to detect a direction of movement of the user, such as when the user enters the room via the door and also when the user exits the room through the door. Furthermore, the SRA 800 is configured to enable different reminder messages to be played depending on the detected direction of movement of the user.

Figure 9:
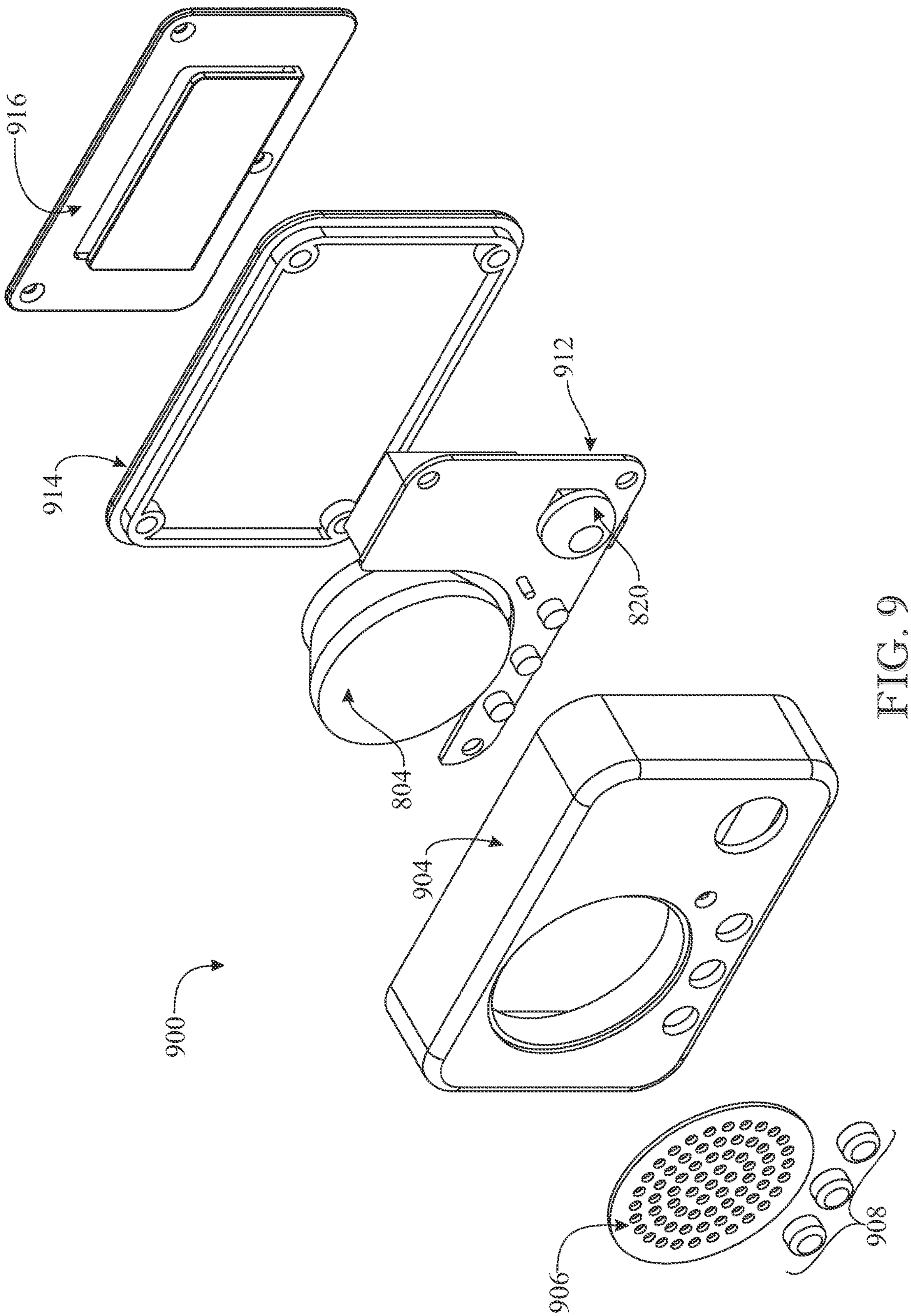
FIG. 9 presents an exploded front elevated view of the SRA of FIG. 8, according to one or more embodiments.

FIG. 9 presents an exploded front elevated view of the SRA of FIG. 8, according to one or more embodiments. View 900 shows a front cover 904, a speaker mesh 906, buttons 908, motion sensor(s) 820, a printed circuit board (PCB) 912, a back cover 914, a wall mount for attaching SRA 800 to a wall, and a speaker 804. FIG. 10 presents an exploded rear elevated view of the SRA of FIG. 8, according to one or more embodiments. View 1000 shows from a different perspective the components of view 900. As a result of the perspective of view 1000, components of the PCB 912, which components are not visible in view 900, are shown in view 1000. Thus, view 1000 additionally shows memory 1002, a micro-controller 1004 (i.e., the controller 1004) and a battery unit 1006. In addition, view 1000 shows USB C port 1018.

Certain of the functions supported and/or provided by the controller 1004 are implemented as processing logic (or code) executed by a processor subsystem and/or other device hardware/components having processing capabilities within and/or associated with the controller 1004, which processing logic enables the controller 1004 to implement/perform those function(s). Among the software/firmware code/instructions/logic provided by a smart reminder message (SRM) utility/module, and which are specific to the disclosure, are: (a) logic for pre-recording via an electronic device one or more messages to be used to remind a target individual to perform one or more selected tasks based on the individual's movement activities, wherein the electronic device includes and/or communicates with one or more sensors to detect the target individual's movements; (b) logic for detecting via one or more sensors when an individual enters and/or exits a selected space; (c) logic for detecting a direction of movement of the user; (d) logic for initiating a playback of audible messages in response to detecting the individual entering or exiting the space; (e) logic for playing user specific and/or direction specific reminder messages to an individual; (f) logic for prompting the individual to record a message when there are no recorded messages available; and (g) logic for enabling the individual to erase a recorded reminder message when action has been taken to fulfill tasks indicated by the reminder message. According to the illustrative embodiment, when controller 1004 executes the SRM logic/module, the SRA 800 initiates a series of functional processes that enable the above functional features as well as additional features/functionality. These features/functionalities are described in greater detail within the description of FIGS. 8-12.

Those of ordinary skill in the art will appreciate that the hardware components and basic configuration depicted in FIGS. 8-12 may vary. The illustrative components within SRA 800 are not intended to be exhaustive, but rather are representative to highlight essential components that are utilized to implement the present disclosure. For example, other devices/components may be used in addition to or in place of the hardware depicted. The depicted example is not meant to imply architectural or other limitations with respect to the presently described embodiments and/or the general disclosure.

Figure 11:
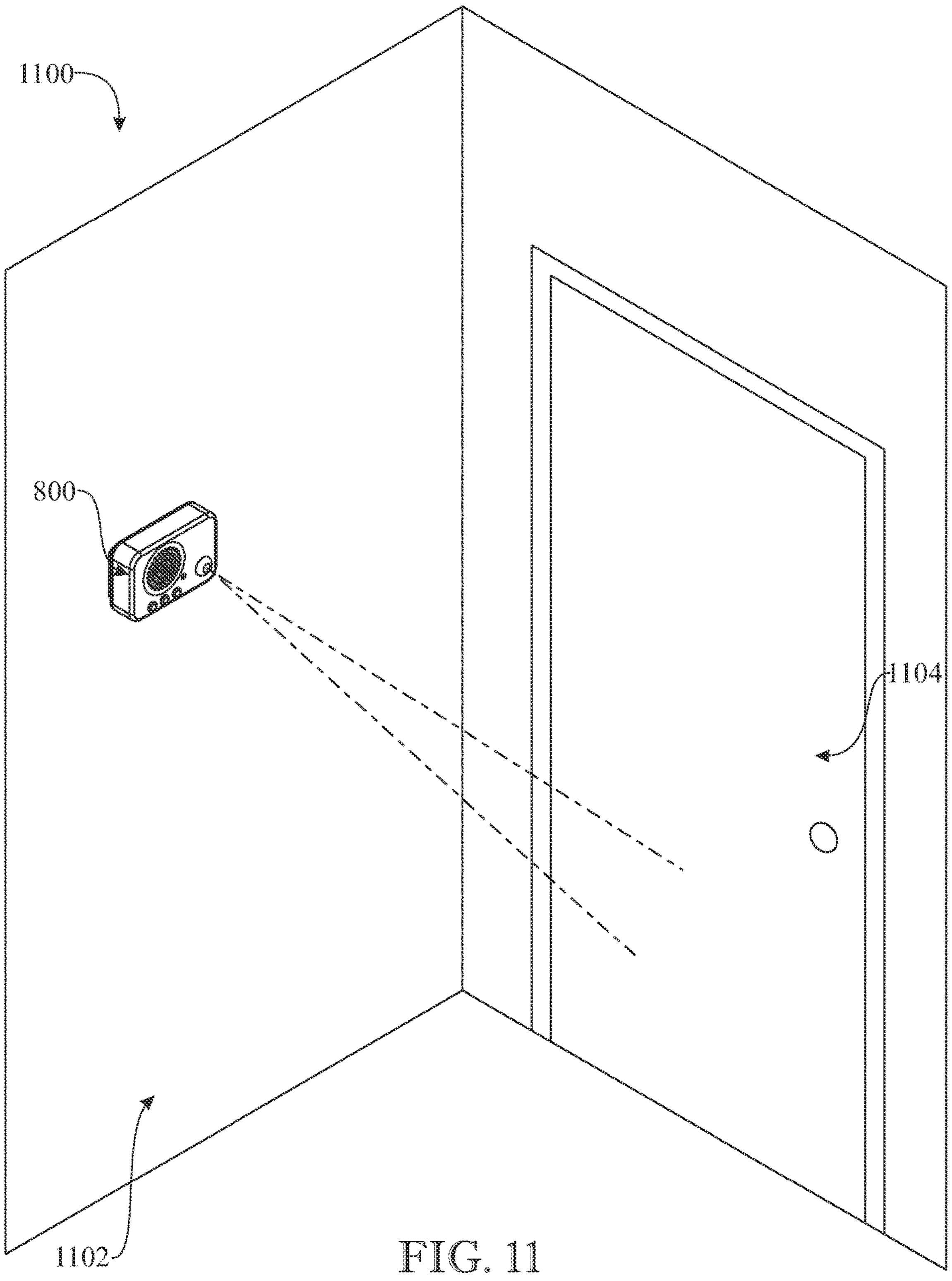
FIG. 11 presents a view of a room in which the SRA of FIG. 8 is installed to detect movement activity by a doorway, according to one or more embodiments.

FIG. 11 presents a view of a room in which the SRA of FIG. 8 is installed to detect activity by a doorway, according to one or more embodiments. View/room 1100 shows the SRA 800 positioned on a wall 1102 proximate to a door 1104 and near a corner of the room. The door 1104 enables an individual such as a user of SRA 800 to enter and also to exit the room. The SRA 800 is selectively positioned to enable detection of an individual entering or leaving the room. In addition, the SRA 800 is positioned to enable the individual to hear audible reminder messages whose playback can be triggered by detecting human entry and exit activity via the door 1104 of the room.

The SRA 800 provides reminders to an individual when entering or exiting a room or other selected spaces. The speaker(s) 804, the microphone 806 and the motion sensor(s) 820 are in communication with the controller 1004. The SRA 800 enables a user to record one or more reminder messages indicating items to be transported/transferred from one location to a next location as well as tasks to be performed in association with the user's entry into or departure from a selected room. When the SRA 800 is installed within the room, the SRA 800 is able to detect the opening and closing of a target door of the room via sensor data received via the motion sensor(s) 820. According to an aspect, the SRA 800 is configured to determine whether a recorded message is currently available and to prompt a user to record a message if no message is recorded when the SRA 800 detects that the user has entered or exited the vehicle. If a message is already recorded, the SRA 800 plays the message each time the user exits the room and/or re-enters the room as long as the recording is not deleted. The user can choose to erase the message once action has been taken to fulfill the tasks indicated by the pre-recorded message reminders.

Figure 12:
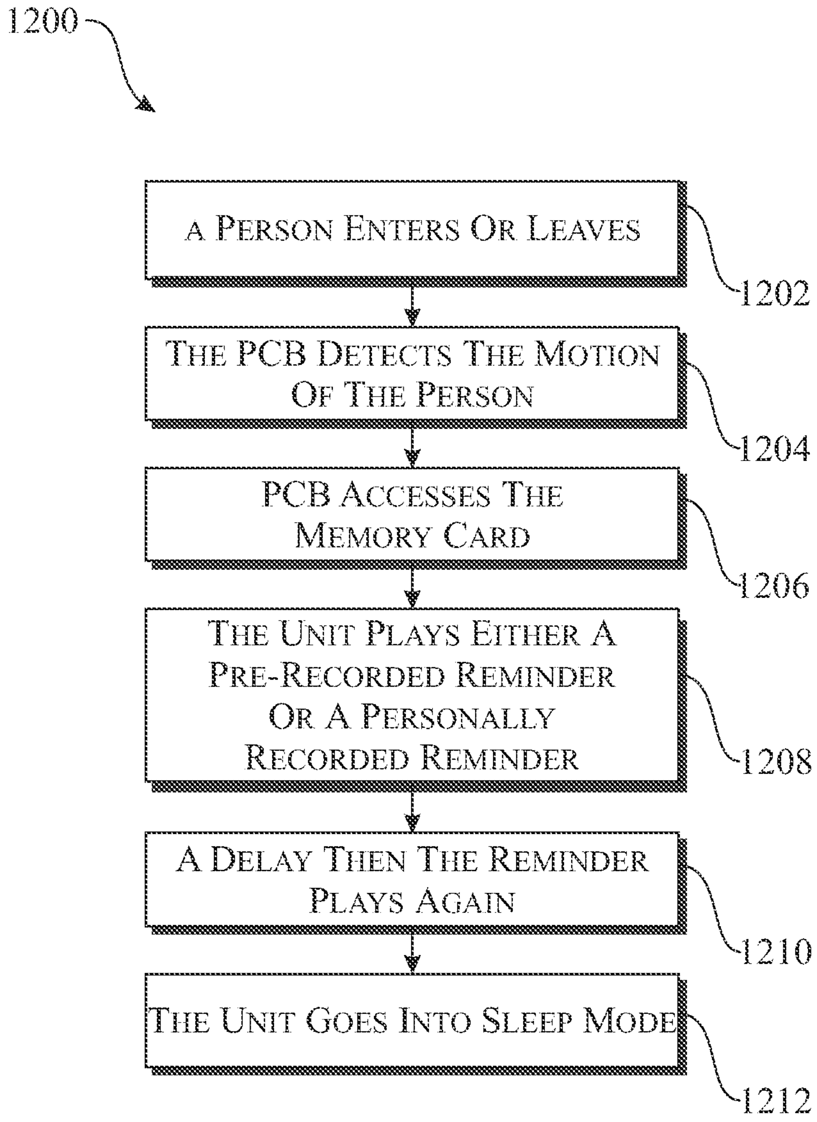
FIG. 12 presents a flow chart illustrating the process of providing reminder messages in response to detecting motion by an individual, according to one or more embodiments.

FIG. 12 is a flow chart illustrating a method by which the above process of the illustrative embodiments is completed. Although the method illustrated in FIG. 12 may be described with reference to components shown in FIGS. 8-11, it should be understood that this is merely for convenience and alternative components and/or configurations thereof can be employed when implementing the various methods. Key portions of the methods may be completed by the controller 1004 and/or a smart reminder message (SRM) module executing on a processor subsystem within a controller 1004 (FIG. 10) of SRA 800 and controlling specific operations of/on SRA 800, and the methods are thus described from the perspective of either/both the SRM module and the controller 1004 or other device that provides the functionality associated with one or more versions of the SRM module.

FIG. 12 presents a flow chart illustrating the process of providing reminder messages in response to detecting motion by an individual, according to one or more embodiments. The process of FIG. 12 begins at block 1202 at which a user enters or leaves a target room and proceeds to block 1204 at which the controller 1004 uses motion sensor data to detect the user's motion associated with entering or leaving the room. At block 1206, the controller 1004 access the memory card. At block 1208, the controller 1004 plays either a pre-recorded reminder or a personally recorded reminder. At block 1210, the controller 1004 replays the reminder message after a preset delay. At block 1212, the controller 1004 places the SRA 800 into a sleep mode. The process proceeds to an end.

According to one or more aspects of the present disclosure, it is contemplated that a smart reminder system can be incorporated into a mobile device(s) such as a smart phone(s). It is further contemplated that the mobile device may communicate with sensors, such as motion and/or optical sensors, placed within a space to provide a monitored space, such as within a vehicle or a room, to notify the user when he and/or another selected individual enters or leaves a space. It is also contemplated that the smart reminder system could utilize recognition software/technology to identify particular users and to map users to user specific messages. In addition, the smart reminder system can be designed to provide user selectable options via a graphical user interface (GUI). Additionally, the smart reminder system may utilize location based services such as GPS to trigger the playback of messages when a user reaches or arrives at a particular location and/or destination.

As described herein, an apparatus, a method and a computer program product provides reminders to an individual when entering or exiting a vehicle or other selected spaces. A smart reminder apparatus comprising a speaker(s), and a number of sensors including motion sensors, a microphone and/or optical sensors in communication with a controller enables a user to record one or more reminder messages indicating items to be transported/transferred from one location to a next location as well as tasks to be performed in association with the user's entry into or departure from a particular location and/or space. The reminder apparatus is placed in selected areas/spaces which transforms the area into a monitored space. According to an aspect, the apparatus can be configured to determine whether a recorded message is currently available and to prompt a user to record a message if no message is recorded when the apparatus detects that the user has entered or exited a monitored space. If a message is already recorded, the apparatus plays the message each time the user exits the space and/or re-enters the space as long as the recording is not deleted. The user can choose to erase the message once action has been taken to fulfill the tasks indicated by the reminders.

According to one or more aspects, the SRA includes a RECORD button that is used to activate a microphone during a personal recording mode. A PLAYBACK button is used to listen to reminder messages previously stored/recorded in memory during a personal recording mode.

According to an aspect, the microphone is used to record audio in the personal recording mode. A speaker is used to play stored audio recordings when signaled by the controller.

According to an aspect, the SRA is designed having multiple (e.g., two) motion sensors. A second motion sensor can be used to detect movement which occurs when a user exits a target door, such as a front door. According to a related aspect, the SRA can be configured to use dual motion sensors to detect a direction of movement of the user, such as when the user enters the room via the door and also when the user exits the room through the door. Furthermore, the SRA can be configured to enable different reminder messages to be played depending on the detected direction of movement of the user.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A device for providing reminder messages, comprising:

a housing that includes an internal space;

a printed circuit board that includes a micro-controller disposed inside of the internal space of the housing;

a speaker in communication with the printed circuit board;

a microphone in communication with the printed circuit board;

a detector in communication with the printed circuit board;

a power supply powering the speaker, the detector, and the microphone; and one or more control buttons disposed on the housing configured to close one or more etched pathways on the circuit board, wherein the micro-controller of the device is configured to:

determine whether a recorded message is available when the detector sends a signal to the micro-controller after detecting a triggering event;

activate the emission of at least one audible message through the speaker in response to the determination that the recorded message is available; and prompt a user to record a message in response to the determination that the recorded message is not available, wherein the one or more control buttons comprise an ON/OFF Mode switch that is configured to at least switch the device between a pre-recorded message reminder mode and a personal recorded message reminder mode, wherein the pre-recorded message reminder mode comprises repeatable reminder messages, and wherein the personal recorded message reminder mode comprises one-time reminder messages.

2. The device of claim 1, wherein the housing includes a speaker opening with a speaker mesh covering the opening.

3. The device of claim 1, wherein the device further comprises a port that is in communication with the printed circuit board.

4. The device of claim 3, wherein the port is connectable to a vehicle's port and the port of the device detects if the vehicle's engine is off or if the vehicle's driver door is open.

5. The device of claim 1, wherein the triggering event includes a voltage drop detected by the detector.

6. The device of claim 1, wherein the triggering event includes an object's movement detected within a radius of detection by the detector.

7. The device of claim 1, wherein the printed circuit board is connected to a memory bank having sufficient storage space to retain a plurality of sound messages.

8. The device of claim 1, wherein the housing is mountable onto a car's interior cabin surface.

9. The device of claim 1, wherein the housing is mountable onto a vertical upstanding surface.

10. The device of claim 1, wherein the ON/OFF Mode switch is further configured to activate and deactivate the device when a first interaction type is applied, wherein the first interaction type comprises a long hold press on the ON/OFF Mode switch, wherein the ON/OFF Mode switch is configured to switch the device between a pre-recorded message reminder mode and a personal recorded message reminder mode when a second interaction type is applied, and wherein the second interaction type comprises a short hold press on the ON/OFF Mode switch.

11. The device of claim 1, wherein the power supply is a battery and wherein the battery is rechargeable through a universal port.

12. The device of claim 1, wherein depressing a control button of the one or more control buttons activates the microphone to detect sound, capture and store the sound in a memory bank connected to the printed circuit board.

13. The device of claim 1, wherein the at least one audible message is played at least twice after the triggering event.

14. The device of claim 13, wherein a time gap of a few seconds occurs between a first audible message and a second audible message.

15. The device of claim 1, wherein the micro-controller reduces power consumption by maintaining the device in a dormant power-saving mode until the detector detects the triggering event and signals the micro-controller.

16. A device for providing reminder messages, comprising:
- a housing that includes an internal space;
- a printed circuit board that includes a micro-controller disposed inside of the internal space of the housing;
- a speaker in communication with the printed circuit board;
- a microphone in communication with the printed circuit board;
- a motion detector in communication with the printed circuit board;
- a battery powering the speaker, the motion detector, and the microphone; and
- one or more control buttons disposed on the housing configured to close one or more etched pathways on the circuit board,
  - wherein the micro-controller of the device is configured to:
    - determine whether a recorded message is available when the motion detector sends a signal to the micro-controller after detecting a triggering event;
    - activate the emission of at least one audible message through the speaker in response to the determination that the recorded message is available; and
    - prompt a user to record a message in response to the determination that the recorded message is not available,
  - wherein the one or more control buttons comprise an ON/OFF Mode switch that is configured to at least switch the device between a pre-recorded message reminder mode and a personal recorded message reminder mode, wherein the pre-recorded message reminder mode comprises repeatable reminder messages, and wherein the personal recorded message reminder mode comprises one-time reminder messages.

17. The device of claim 16, wherein the housing is mountable onto a wall or door surface.

18. The device of claim 16, wherein the at least one audible message is played at least twice after motion is detected, and a time gap of a few seconds occurs between a first audible message and a second audible message.

19. A method for providing reminder messages via a device, the method comprising:
- providing a device comprising:
  - a housing that includes an internal space;
  - a printed circuit board that includes a micro-controller disposed inside of the internal space of the housing;
  - a speaker in communication with the printed circuit board;
  - a microphone in communication with the printed circuit board;
  - one or more sensors in communication with the printed circuit board;
  - a power supply powering the speaker, the sensor, and the microphone; and
  - one or more control buttons disposed on the housing configured to close one or more etched pathways on the circuit board, wherein the one or more control buttons comprise an ON/OFF Mode switch that is configured to at least switch the device between a pre-recorded message reminder mode and a personal recorded message reminder mode, wherein the pre-recorded message reminder mode comprises repeatable reminder messages, and wherein the personal recorded message reminder mode comprises one-time reminder messages;
- pre-recording one or more audible messages to be used as reminders;
- detecting via the one or more sensors when an object enters or exits a detection zone;
- determining whether a recorded message is available in response to detecting the object entering or exiting the detection zone;
- initiating a playback of the one or more audible messages in response to the determination that the recorded message is available; and
- prompting a user to record a message in response to the determination that the recorded message is not available.

20. The method of claim 19, further comprising:
- enabling selective removal of the recorded message.

* * * * *